United States Patent
Ng et al.

[11] Patent Number: 5,763,793
[45] Date of Patent: Jun. 9, 1998

[54] ERROR CORRECTING TORQUE SENSOR

[75] Inventors: Harris Ng, Royal Oak; John A. De Franco, Farmington Hills; Matthew B. LaCourse, Grosse Ile, all of Mich.; Mohan J. Devsam, Hamilton, Ill.; Liu Qiyuan, Keokuk, Iowa

[73] Assignee: Methode Electronics, Inc., Chicago, Ill.

[21] Appl. No.: 784,410

[22] Filed: Jan. 16, 1997

[51] Int. Cl.⁶ .................................................. G01L 3/02
[52] U.S. Cl. ................................ 73/862.326; 73/862.325
[58] Field of Search ..................... 73/862.191, 862.195, 73/862.325, 862.326

[56] References Cited

U.S. PATENT DOCUMENTS

| | | | |
|---|---|---|---|
| 5,247,839 | 9/1993 | Okutani et al. | 73/862.326 |
| 5,400,663 | 3/1995 | Bridges | 73/862.326 |

*Primary Examiner*—Elizabeth L. Dougherty
*Attorney, Agent, or Firm*—Jeffrey H. Canfield

[57] ABSTRACT

A torque sensor is provided for measuring the amount of torque being applied to a rotatable shaft fitted with a torsion bar between two separate shaft segments. The sensor includes first rotor attached to a first shaft segment such that angular rotation of the first segment is translated to the rotor. A second rotor is attached to the second shaft segment such that angular rotation the second shaft segment is translated to the second rotor. The first rotor supplies two pairs of signal voltage references circumferentially spaced around a surface of the first rotor. At least one resistive track having a uniform linear resistance extends between the voltage signal references of each pair. A pair of contact carriers are positioned between the first and second rotors. Surface features formed in the contact carriers and the first rotor couple the contact carriers to the first rotor such that the contact carriers are constrained to move anullarly around the central axis of rotation of the first rotor. The contact carriers are anullarly driven by the second rotor. First and second signal contacts are mounted to said the contact carriers, and are configured to engage the at least one resistive track at a points between the said first pair of signal voltage references, and said second pair of signal voltage references respectively. Output voltage signals are developed from said first and second signal contacts proportional to the relative position of said signal contacts between said voltage reference pairs. A method of correcting signal errors introduced from misalignment of the two shaft segments is provided by subtractively averaging the two independent voltage signals.

27 Claims, 5 Drawing Sheets

ERROR CORRECTING TORQUE SENSOR

BACKGROUND OF THE INVENTION

The present invention relates to an electronic torque sensor for measuring the amount of torque being applied to a rotatable shaft.

A need for reliable and inexpensive torque sensors has arisen in applications such as electric power steering systems in automobiles. The present invention provides a sensor for measuring the torque applied to a torsion bar system comprising a segmented shaft fitted with a compliant torsion bar joining the segments, as is well known in the art. In most cases one shaft segment will have a smaller diameter relative to the other shaft segment. Torque applied to one end of the shaft causes the first shaft segment to rotate relative to the second shaft segment due to the compliance of the torsion bar. The magnitude of torque being applied to the shaft can be readily derived from the relative motion between the two shaft segments.

Previous torque sensors have employed a combination of rotors attached to each shaft segment to measure the relative motion between the shaft segments. A first "torque rotor" is attached to the smaller diameter shaft segment, and a second "circuit rotor" is attached to the larger diameter shaft. Generally, the circuit rotor supplies a signal reference voltage and a signal ground reference to a resistive track. The torque rotor supplies a signal contact which rides along the resistive track at a point between the signal reference voltage and the signal ground reference supplied by the circuit rotor. The resistive track acts as a voltage divider between the positive voltage reference and the torque contact, and the torque contact and the ground potential reference. Thus, the output voltage of the sensor, as measured at the torque contact, will lie somewhere between the voltage reference potential and ground potential. As torque is applied to the shaft, the two shaft segments rotate relative to one another. The relative motion of the two shaft segments causes the torque contact to move in relation to the ground and voltage references, moving either closer to the ground reference and further from the signal reference, or closer to the signal reference and further from the ground reference, depending on which direction the torque is applied. In either case, the output voltage on the torque contact changes as the contact moves along the resistive track. The output voltage increases as the torque contact moves closer to the signal reference, and decreases as the torque contact moves toward the ground reference. The sensor thereby supplies an output voltage signal proportional to the amount of torque being applied to the shaft.

In one design, the resistive track is formed as an arc of resistive material screened directly onto a surface of the circuit rotor. The signal reference voltage is applied to one end of the arc, and a ground potential applied to the other. The torque contact extends from the torque rotor and rides along the surface of the arc. The two rotors are free to rotate in unison as the shaft is turned. However, when torque is applied to the shaft the two rotors rotate relative to each other, and the torque contact moves along the resistive arc as described above, thereby generating a torque signal.

In another design, the resistive track is formed on a separate, stationary printed circuit board. The track is circular, and contact elements extend from both rotors to ride along the surface of the resistive track as the shaft assembly rotates. Both a signal reference voltage contact and a ground reference contact extend from the circuit rotor, and a torque signal contact extends from the torque rotor. When properly aligned, the torque signal contact extends from the torque rotor at a point directly between the signal reference voltage contact and the ground reference contact from the circuit rotor. Torque applied to the shaft assembly causes the rotors to rotate relative to one another, thereby causing the contacts to move relative to one another, changing their relative spacing along the resistive track. The resistive track acts as a voltage divider, the changing resistance ratio between the torque contact and the signal reference contacts generating an output signal proportional to the amount of torque applied to the shaft assembly as described above.

In either design, it is desirable to generate two independent output signals in order to enhance the reliability of the sensor. Generally the contact arrangements described above will be repeated 180° apart from a first set of contacts. The second set of contacts operate exactly like the first, except the polarity is reversed. Thus, while torque applied in one direction will cause the first torque output signal to increase, the same torque will cause the second output signal to decrease, and vice versa. The result being two output signals having opposite slopes.

A problem with existing sensor designs is that they are sensitive to misalignment problems. Typically the two shaft segments will not be perfectly centered along the axis of rotation of the shaft assembly. The compliance of the torsion bar, and common manufacturing tolerances can lead to as much as a 1 mm offset between the shaft segments. As a result of such an offset, the torque contacts on the torque rotor do not always line up properly with the signal reference contacts provided by the circuit rotor. When the shaft segments are not aligned, the torque contacts are not centered between the references, and the sensor outputs false torque signals. To illustrate this point, assume a positive voltage reference of +5.0V supplied by the circuit rotor. With both shaft segments in proper alignment and no torque applied to the shaft assembly, each of the two torque contacts will be positioned against the resistive track at points exactly half way between their respective +5.0V and ground references. The 5.0V voltage drop between the +5.0V signal reference and the signal ground reference will be equally divided by the torque contacts, so that the voltage present at each torque contact will be +2.5V. In other words, when using a +5.0V signal reference, an output voltage of +2.5V indicates that no torque is being applied to the shaft. If torque is applied to the shaft assembly in the clockwise direction, the torque rotor will rotate relative to the circuit rotor. The first torque contact will rotate along the resistive track toward the +5.0V reference, and the second torque contact will rotate toward the ground reference. Depending on the amount of torque applied, the voltage on the first torque contact will increase toward +5.0V and the voltage on the second torque contact will decrease toward 0.0V. Thus, an output voltage on the first torque signal greater than +2.5V and an output voltage on the second torque signal less than +2.5V will indicate torque being applied in the clockwise direction, the magnitude of the torque applied being proportional to the change in voltage from +2.5V to the output measured at the torque contact. Conversely, an output voltage on the first torque signal less than +2.5V and an output voltage on the second torque signal greater than +2.5V will indicate torque being applied in the counterclockwise direction, the amount of torque being proportional to the size of the change in voltage from +2.5V. In either case, the amount of positive voltage change on one torque contact will equal the amount of negative voltage change on the other torque contact since the two contacts are mounted on the same rotor and move in unison.

If, however, the two shaft segments are misaligned, the voltage on the two torque output contacts will not behave as expected. Because the two shafts are off center, the torque contacts will not line up directly between the signal voltage reference and the ground reference contacts. Thus, the at rest, or zero torque signal will measure something other than one half the signal reference voltage. For example, again using a +5.0V signal reference, the torque signals can be expected to be +2.5V at each torque output contact. However, if the two shall segments are misaligned such that both torque output contacts are shifted toward their respective ground references, the voltage on both output contacts will be less than +2.5V even though there is no torque applied to the shaft. With both signals below +2.5V it is obvious that there is an error, since under normal conditions torque applied to the shaft will cause one signal rise above +2.5V and the other to fall below +2.5V. Under these conditions, with both signals being equal, it can be assumed that no torque is being applied to the shaft. However, if the two signals are not equal, it is impossible to determine how much torque is being applied.

What is needed is a torque sensor which can accommodate offset shaft segments, yet still provide an accurate output signal proportional to the amount of torque being applied to the shaft. Such a sensor should be capable of monitoring the relative positions of two separate shaft segments which are joined by a compliant torsion bar. Such a sensor should also allow the shaft to rotate freely and should further generate at least one output signal which is proportional to the amount of torque being applied to the shaft regardless of whether the two shaft segments are in perfect alignment.

SUMMARY OF THE INVENTION

In light of the prior art as described above, one of the main objectives of the present invention is to provide a reliable and inexpensive torque sensor.

Another object if the present invention is to provide a torque sensor capable of providing an accurate output voltage signal which is proportional to the amount of torque being applied to a rotatable shaft.

A further object of the present invention is to provide a torque sensor which develops two independent torque signals of opposite slope which can be subtractively averaged to compensate for signal errors introduced as a result of misalignment of various sensor components.

Still another objective of the present invention is to provide a torque sensor having two independent contact carriers driven from a first shaft segment and interacting with a circuit rotor driven form a second shaft segment to develop two independent torque signals.

Yet another objective of the present invention is to provide a torque sensor where two independent contact carrier elements are directly coupled to a circuit rotor so that motion of the contact carriers relative to the circuit rotor is limited to angular rotation about the axis of rotation of the circuit rotor.

An additional objective of the present invention is to provide a torque sensor where two independent contact carriers are driven from a separate torque driver rigidly attached to a first shaft segment.

A still further objective of the present invention is to provide a torque sensor having two independent contact carriers and a separate torque driver which are configured so that only angular motion centered on the axis of rotation of the circuit rotor is imparted from the torque driver to the contact carriers, and any motion directed otherwise is absorbed by the linkage between the torque driver and the contact carriers.

All of these objectives, as well as others that will become apparent upon reading the detailed description of the presently preferred embodiment of the invention, are met by the Torque Sensor herein disclosed.

In the presently preferred embodiment a torque sensor is provided for measuring the amount of torque being applied to a rotatable shaft. The shaft is a two segment torsion bar system where two separate shaft segments are joined by a compliant torsion bar. As torque is applied to either end of the shaft assembly, the torsion bar compresses, and the two shaft segments rotate slightly relative to one another. By measuring the amount of rotation between the two shaft segments it is possible to determine the amount of torque which is being applied to the shaft. The present invention measures the relative positions of the two shaft segments by monitoring the interaction of two rotors which are firmly attached to each shaft segment. The two rotors are supplied with electrical contacts which allow them to interact with a resistive track. Through the interaction of the electrical contacts with the resistive track, a voltage signal is developed which is proportional to the amount of torque being applied to the shaft.

In the preferred embodiment the resistive track is formed in a circular pattern on a stationary printed circuit board that is mounted to the sensor housing. The printed circuit board is mounted such that the resistive track is centered on the axis of rotation of the shaft. Contacts extend from both rotors to contact the resistive track to develop a torque signal as is known in the art. Alternate arrangements for the rotor contacts and the resistive track are also known in the art, such as placing resistive arcs directly on one of the rotors and supplying voltage references directly to each end of the arcs. The novel features of the present invention relate to controlling the relative motion between rotors and the manipulation of the resultant signals. The scope of the invention should not be considered as limited to any particular arrangement of the signal contacts and the resistive track.

As noted, in the preferred embodiment the resistive track is formed on a separate printed circuit board mounted to the sensor housing. Signal reference contacts extend from a "circuit rotor" to physically engage the resistive track. As the first rotor rotates with the shaft, the signal reference contacts circle around the resistive track. Two sets of signal reference contacts, each including a signal voltage reference contact and a signal ground reference contact, are supplied by the circuit rotor, approximately 180° apart from one another. The two sets of contacts are identical except that their polarity is reversed. The reversed polarity causes the two output signals associated with each set of contacts to have the opposite slope when torque is applied to the shaft. On the opposite side of the circuit rotor a pair of arcuate depressions are formed near the inner circumference of the circuit rotor to engage mating arcuate ridges formed on a pair of contact carrier elements driven by a separate "torque drive" rotor. Together the arcuate depressions and arcuate ridges form a surface feature type coupling constraining the relative motion of the contact carriers with reference to the circuit rotor to angular motion centered on the rotational axis of the circuit rotor.

The second rotor, or torque driver, is attached to the second shaft segment. The torque driver is used to drive the two independent torque signal contact carriers in relation to the circuit rotor. The torque driver includes a pair of arms which extend radially from the torque driver 180° apart. Drive blocks extend perpendicularly from the end of each arm in the direction of the circuit rotor. The drive blocks define radial slots for engaging drive pins extending form the contact carriers. The drive blocks act on the contact pins to drive the contact carriers as the second rotor rotates.

Two torque signal contacts extend from the two independent contact carriers to interact with the voltage reference contacts of the circuit rotor and the resistive track. Drive pins are formed near the outer perimeter of the contact carriers for engaging the slotted drive blocks of the drive rotor. The diameter of the pins equals the width of the slots so that motion of the torque driver which is directed circularly around the axis of the circuit rotor is directly transferred to the contact carriers. However, the slots are elongated so that motion of the torque driver which is directed other than rotationally around the axis of the circuit rotor is taken up within the excess length of the slots, and has no effect on the position of the contact carriers relative to the circuit carrier. Thus, if the torque driver and circuit rotor are slightly offset due to misalignment of the two shaft segments, only purely rotational movement between the two shaft segments is translated to the torque signal contacts, thus preventing offset error from being introduced into the signals.

With this arrangement, if the shaft segments are offset, the torque signal reported from the torque contacts will be proportional to the amount of torque applied, but the amplitude of the signals will not behave as expected in comparison to when the two segments are properly aligned. Therefore the signals must be adjusted. A true torque signal can be derived by subtracting the second signal from the first signal and dividing by two. The result is a voltage signal that is directly proportional to the amount of torque being applied to the shaft. Zero torque will result in signal voltage of Zero volts. Torque applied in one direction will result in a positive voltage signal and torque in the other direction will result in a negative voltage signal. The maximum torque applied in either direction will result in a signal having an amplitude equal to one half of the signal voltage reference supplied by the circuit rotor.

DETAILED DESCRIPTION OF THE PRESENTLY PREFERRED EMBODIMENTS

The present invention is for a Torque Sensor for measuring the amount of torque being applied to a rotatable shaft.

The subject shaft on which torque is to be measured must be allowed to rotate freely at least through several rotations, such as when a steering column is rotated from an extreme left turn position to an extreme right turn position. The torque sensor of the present invention is configured to measure torque on a shaft comprised of two shaft segments joined by a compliant torsion bar, torque being measured by monitoring the compliance of the torsion bar as the two shaft segments rotate relative to one another in response to the turning moment being applied.

Figure 1:
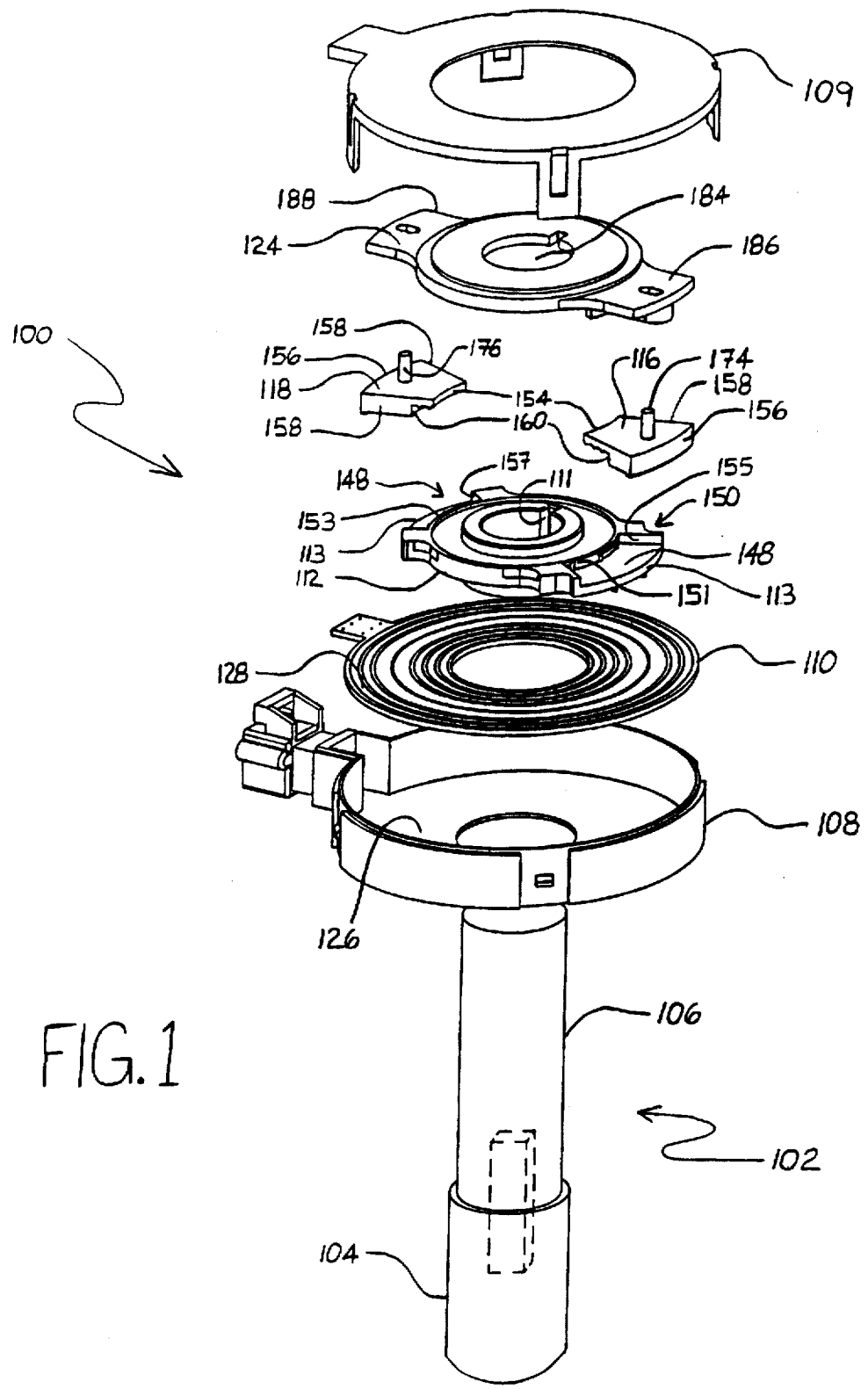
FIG. 1 is an exploded isometric view of a torque sensor according to the present invention showing the upper surfaces of the various sensor components.
Figure 2:
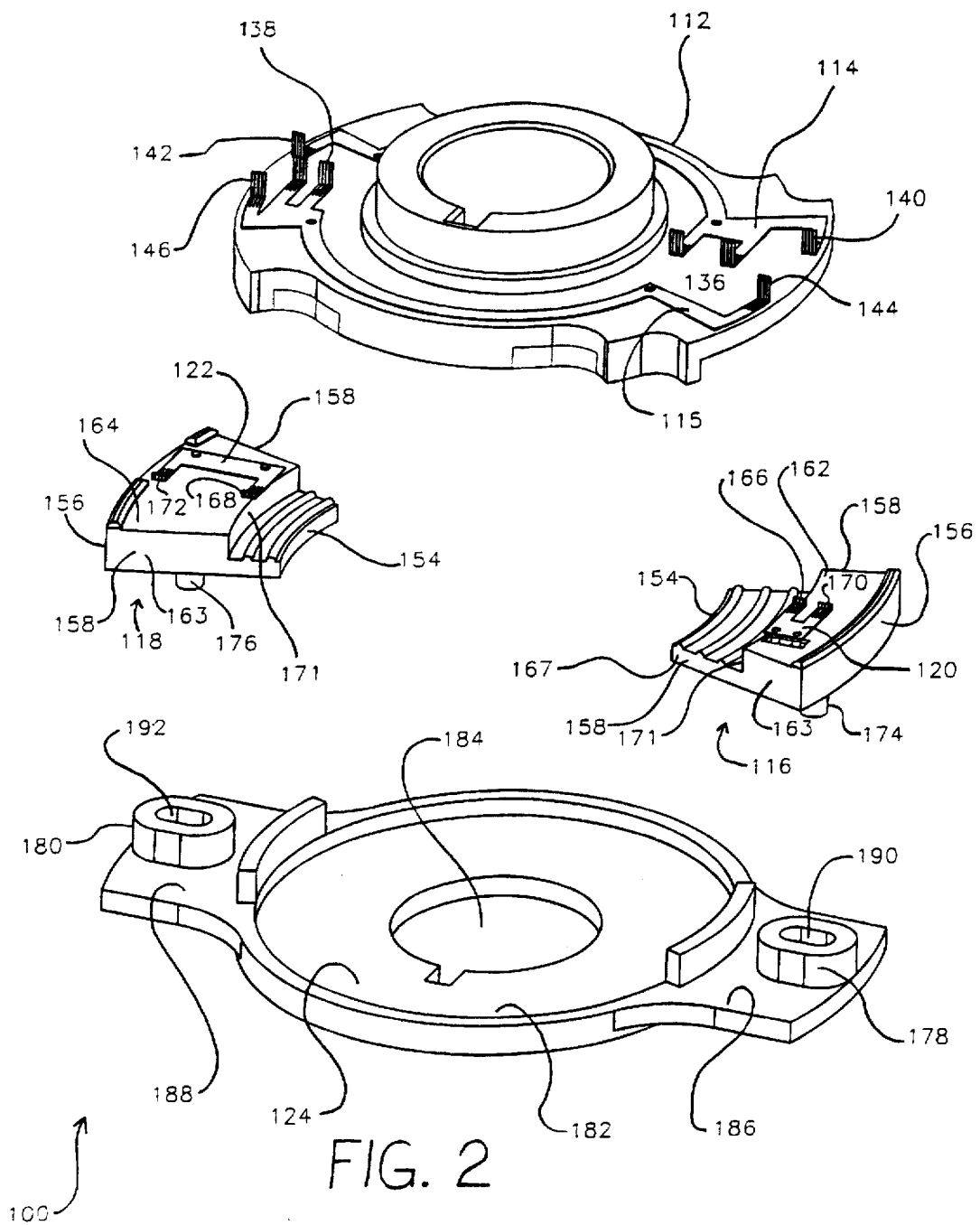
FIG. 2 is an exploded isometric view of a torque sensor according to the present invention showing the lower surfaces of the various sensor components.

Referring now to FIGS. 1 and 2, exploded isometric views of a torque sensor according to the present invention are shown. FIG. 1 shows a top perspective view of the sensor, and FIG. 2 shows a bottom perspective. The terms "top" and "bottom" being used here are for purposes of illustration only. The sensor itself can be effectively mounted in any spatial orientation, and the particular orientation described herein should not be considered as limiting the scope of the present invention in any way.

A torque sensor 100 is shown for measuring torque on a rotatable shaft 102. The shaft being formed from a first shaft segment 104 and a second shaft segment 106. In the preferred embodiment first shaft segment 104 has a somewhat larger diameter than second shaft segment 106. First and second shaft segments 104, 106 are joined by a compliant torsion bar 107. Sensor 100 includes a housing 108; a stationary printed circuit board 110; a first "circuit" rotor 112; a first pair of contact inserts 114, 115; first and second contact carriers 116, 118; corresponding signal contact inserts 120, 122, and a second "torque driver" rotor 124 and a cover 109.

Figure 3:
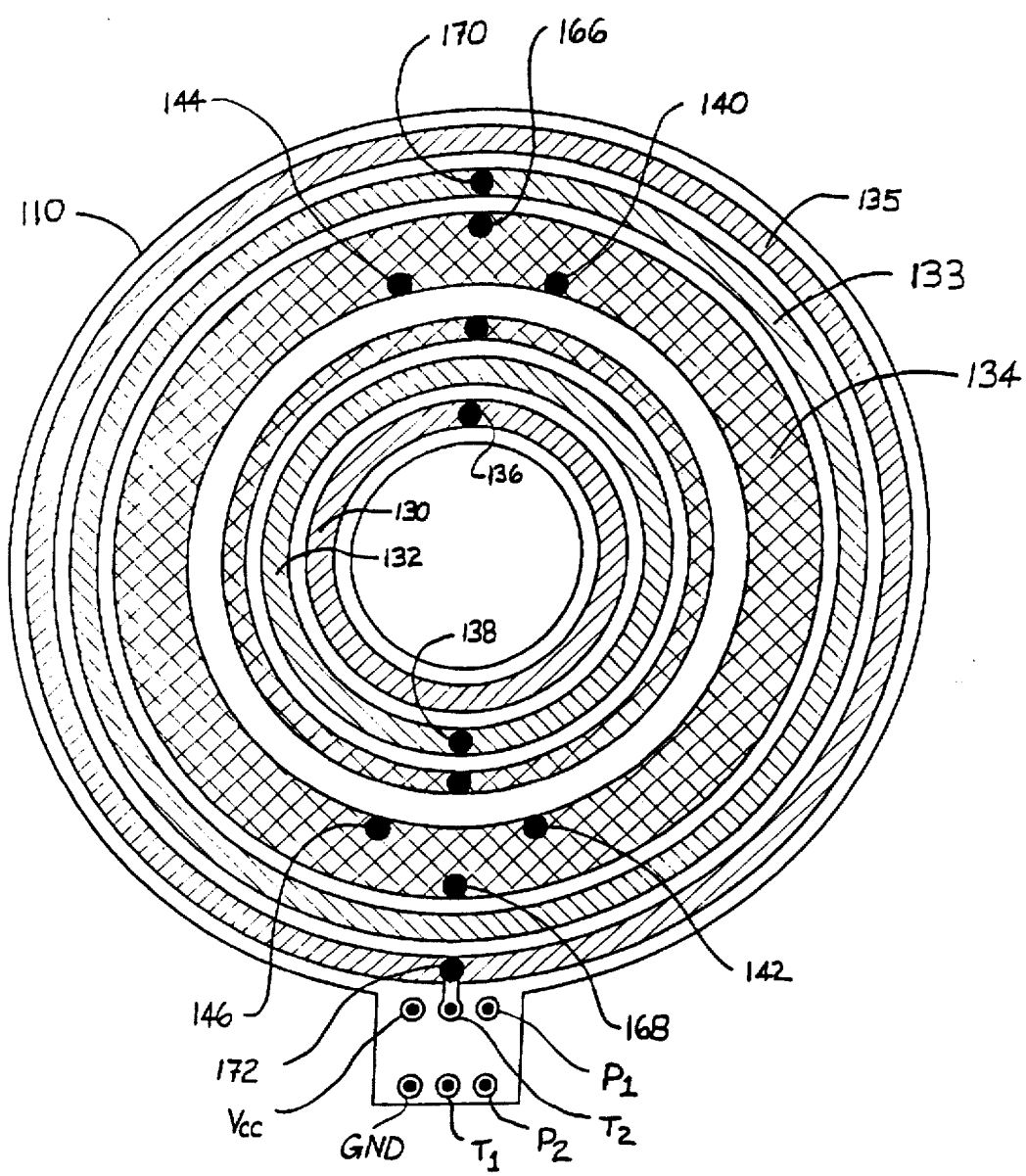
FIG. 3 is a plan view of a stationary disc according to the preferred embodiment of the invention, showing the position of various contacts when the rotatable shaft segments are properly aligned.

Referring to FIGS. 1 and 3, stationary printed circuit 110 board will now be described. Disc 110 is formed of an insulating material such as CERMET or FR4, and mounted near the rear wall 126 of housing 108. A series of circular tracks are formed on the inner surface 128 of disc 110. Inner tracks 130 and 132 are formed of highly conductive material, such as copper. The two inner tracks are electrically connected to external terminals $V_{cc}$ and GND where they can be connected to an external voltage source for supplying a signal voltage reference, and a signal ground reference. Inner tracks 130, 132 supply the ground reference and signal voltage reference signals to circuit rotor 112. Track 134 is formed of resistive material and provides a constant linear resistance around the circumference of the track. Resistive track 134 is used in deriving the torque signals output from the sensor. Outer tracks 133, 135 represent output signal tracks. Output track 133 is connected to an output terminal $T_1$ and represents a first torque signal output from sensor 100. Output track 135 is connected to an output terminal $T_2$ and represents a second torque signal output from sensor 100.

Referring back to FIGS. 1 and 2, circuit rotor 112 is described in more detail. Circuit rotor 112 is rigidly attached to the larger diameter first shaft segment 104 by means of a circular spring member (not shown) which clamps directly to the shaft. Radially protruding tabs extend from the spring member to engage regularly spaced slots 111 formed on the inner circumference of circuit rotor 112. The tabs on the spring member and the slots on circuit rotor form a direct coupling whereby the angular motion of shaft segment 104 is directly translated to circuit rotor 112.

Inserted between circuit rotor 112 and stationary disc 110 are first contact inserts 114, 115. Contact inserts 114, 115 are rotationally driven by circuit rotor 112. Contact inserts 114, 115 are formed of an electrically conductive material, and include a series of electrical contacts which, when sensor 100 is assembled, ride along the various tracks formed on stationary disc 110. In the preferred embodiment, contact inserts 114, 115 are formed of Palieney 6, an engineered material produced by NEY, Inc. of Connecticut. Signal ground reference supply contact 136 rides along the signal ground reference track 130, and supplies a signal ground reference to contact insert 114. Signal voltage reference supply contact 138 rides along signal voltage reference track 132, and supplies a signal voltage reference to contact insert 115. Signal ground reference supply contact 136 is electrically connected to first signal ground reference contact 140 and second signal ground reference contact 142. Signal voltage reference supply contact 138 is electrically connected to first signal voltage reference contact 144, and second signal voltage reference contact 146. Contacts 140, 142, 144 and 146 all ride along resistive track 134 and rotate in unison with circuit rotor 112. In the preferred embodiment, first signal voltage reference contact 144 and first signal ground reference contact 140 are spaced 20° apart, as are second signal voltage reference contact 146 and second signal ground reference contact 142. The 20° spacing between the voltage and ground reference contacts represents the physical limit as to how far the two shaft segments 104, 106 are allowed to rotate relative to one another. Since the degree of relative rotation between the shaft segments varies directly with the amount of torque being applied to the shaft, the spacing between the voltage reference and ground reference contacts represents the torque limits of the sensor itself. While 20° spacing as disclosed herein represents the presently preferred spacing, it should be understood that other spacing can be selected to provide a torque sensor having different characteristics without departing from the novel aspects of the invention.

Since first signal voltage reference contact 144 is connected to voltage reference supply contact 138, and since first signal ground reference 140 is connected to signal ground reference supply contact 136, a voltage drop occurs along the resistive track between contacts 144 and 140 that is equal to the voltage drop between signal voltage reference track 132 and signal voltage ground track 130 as supplied by $V_{cc}$ and GND. A similar voltage drop occurs between second signal voltage reference contact 146 and second signal ground reference contact 142.

On the reverse side of circuit rotor 112, see FIG. 2, a pair of fan shaped depressions 148, 150 are formed at the opposite ends of circuit rotor 112 for receiving contact carriers 116, 118. Each fan shaped depression is bounded in the radial direction by inner diameter arcuate steps 151, 153 and by the outer diameter of circuit rotor 112. The angular bounds of each fan shaped depression are defined by side walls 155, 157. Inner diameter steps 151, 153 and the outer diameter of circuit rotor 112 act as guides for directing the relative motion between contact carriers 116, 118 and circuit rotor 112.

Contact carriers 116, 118 are also fan shaped, having inner diameters 154, outer diameters 156, and straight radial sides 158 extending therebetween. The radius of each inner diameter 154 for each contact carrier 116, 118 is the same as the radius of the corresponding arcuate step 151, 153 of radial depressions 148, 150, to which the inner diameter 154 of contact carriers 116, 118 mate. The radius of the outer diameters 156 of contact carriers 116, 118 is the same as that of the inner diameter of housing 108. The angular width of contact carriers 116, 118, however, is less than the angular width of depressions 148, 150 such that when contact carriers 116, 118 are placed within depressions 148, 150 they are free to translate from side to side within the angular confines of depressions 148, 150.

The lower surfaces of contact carriers 116, 118 are formed with a stepped contour such that an outer portion 163 of each contact carrier 116, 118 is thicker than the corresponding inner portion 167. An arcuate ridge 171 having the same diameter as the outer diameter of circuit rotor 112 divides the wider outer portion 163 from the narrower inner portion 167. When sensor 100 is assembled, the inner, narrower, portion 167 of each contact carrier 116, 118 is seated within depressions 148, 150, and the wider outer, portion 163, 165 is disposed between the outer diameter of contact carrier 112 and the inner diameter of housing 108. The various curved surfaces of contact carriers 116, 118 mate with various curved surfaces of circuit rotor 112 and housing 108 to restrict and guide the relative motion of contact carriers 116, 118 with respect to circuit rotor 112. Inner diameters 154 abut inner diameter arcuate steps 151, 153; arcuate ridges 171 abut the outer diameter of contact carrier 112; and outer diameters 156 abut the inner diameter of housing 108. The movement of contact carriers 116, 118 relative to circuit rotor 112 in the outward radial direction is prohibited by housing 108, and in the inward radial direction by the interaction of arcuate ridge 171 with the outer diameter of circuit rotor 112 as well as the interaction of the inner diameters 154 of contact carriers 116, 118 with inner diameter arcuate steps 151, 153 of circuit rotor 112. However, since the contact carriers 116, 118 are narrower than depressions 148, 150, contact carriers 116, 118 are free to move angularly relative to circuit rotor 112. Thus, the interaction of the various curved surfaces of circuit rotor 112, contact carriers 116, 118 and housing 108 combine to form a surface feature type coupling which restricts the relative motion of contact carriers 116, 118 with respect to circuit rotor 112 to angular rotation about the central axis of circuit rotor 112. The curved mating surfaces of contact carriers 116, 118 ensure the all motion of contact carriers relative to circuit rotor 112 is centered on the axis of rotation of circuit rotor 112.

As noted, the wider outer portion 163 of contact carriers 116, 118 extends beyond the outer diameter of circuit rotor 112. Thus, there is a clear path between the outer portion 163 of contact carriers 116, 118 and stationary disc 110 such that signal contact inserts 120, 122 can extend from contact carriers 116, 118 past circuit rotor 112 to engage the resistive track 134 formed on stationary disc 110. First and second torque signal contact inserts 120, 122 are also formed of Palieney 6 and include signal contact elements 166, 168 and output contact elements 170, 172. Signal contact elements 166, 168 engage and rotate around resistive track 128, output contact 170 engages and rotates around first output track 133, and output contact 172 engages and rotates around second output track 135. The relative positions of the various contacts as they engage the tracks formed on stationary disc 110 can be seen in FIGS. 3, 4, and 5. Output signals developed on signal contact elements 166, 168 are thereby transferred to output tracks 133, 135 where they can be output from sensor 100 via output terminal $T_1$, $T_2$. When the sensor is fully assembled, signal contact elements 166, 168 are positioned circumferentially between first signal ground reference contact 140 and first signal voltage reference contact 144, and second signal ground reference contact 142 and second signal voltage reference contact 146 respectively. (see FIG. 3) along the circular path of resistive track 134. At rest, when no torque is applied to the shaft, signal contact element 166 will be positioned just beyond the circular path traced by contacts 140, 144 as they rotate around resistive track 134, at a point approximately halfway between contacts 140 and 144. In other words, signal contact element 166 will be positioned such that a line drawn from the rotational axis of circuit rotor 112 to contact element 166 would approximately bisect the angle defined by first signal ground reference contact 140, the rotational axis of circuit rotor 112, and first signal voltage reference contact 144. Signal contact element 168 will be similarly positioned between contacts 142 and 146. The arrangement of arcuate depressions 148, 150 and the shape of contact carriers 116, 118 allows signal contact element 166 to rotate freely in the range between contact 140 and 144, and signal contact element 168 to rotate freely in the range between contacts 142 and 146.

On the opposite side of contact carriers 116, 118, drive pins 174, 176 extend toward torque driver 124. The drive pins are cylindrical in shape and are of sufficient length to engage slotted drive blocks 178, 180 formed on torque driver 124. Torque driver 124 rotates with second shaft segment 106. As torque driver 124 rotates, drive blocks 178, 180 act on drive pins 174, 176 to drive contact carriers 116, 118. While contact carriers 116, 118 are constrained to rotate around the axis of circuit rotor 112, their angular position is controlled by torque driver 124 and the angular position of second shaft segment 106.

Torque driver 124 is formed with a generally disc shaped body 182 having a center aperture 184 for attaching the torque driver to second shaft segment 106. Torque driver 124 is attached to second shaft segment 106 in the same manner that circuit rotor 112 is attached to first shaft segment 104, as described above. Drive arms 186, 188 extend radially from main body 182 on opposite ends of torque driver 124. Drive blocks 178, 180 extend from the ends of each drive arm 186, 188 parallel to the axis of rotation of the shaft, and in the direction of contact carriers 116, 118. The drive blocks are formed with slots 190, 192 for receiving drive pins 174, 176 from contact carriers 116, 118. Slots 190, 192 having a minor axis dimension equal to the diameter of drive pins 174, 176.

Drive blocks 178, 180 being attached to the ends of drive arms 186, 188, are forced to move angularly around a circle centered on the rotational axis of second shaft segment 106. Contact carriers 116, 118, on the other hand, are constrained to move angularly around a circle centered on the rotational axis of first shaft segment 104. If the two shaft segments 104, 106 are offset, the contact carriers 116, 118 and drive blocks 178, 180 will be constrained to rotate around circles having different centers. For the torque driver 124 to drive the contact carriers under these conditions, accommodation must be made for the linear offset between the circle traced by drive blocks 178, 180 and the circle traced by drive pins 174, 176. This accommodation is provided for within the length of slots 190, 192, and by the independence of the two torque carriers 116, 118. Any misalignment of the two shaft segments in any direction can be described as consisting of two orthogonal components, one directed parallel to the major axis of slots 190, 192, an the other perpendicular thereto. Any component of shaft misalignment directed parallel to the major axis of slots 190, 192 is absorbed by drive pins 174, 176 sliding up or down the length of slots 190, 192, relative to drive blocks 178, 180. As the two shaft segments 104, 106 rotate relative to one another in response to torque, the paths of drive pins 174, 176 and drive blocks 178, 180 diverge. Drive pins 174, 176 will be forced to move relative to drive blocks 178, 180, sliding either up or down slots 190, 192 depending on the direction of misalignment. As the paths come into closer alignment, pins 174, 176 will be forced back toward the center of slots 190, 192. Thus, components of shaft misalignment directed parallel to the major axis of slots 190, 192 are absorbed, and do not result in error being introduced into the torque signal output.

Components of shaft misalignment directed perpendicular to the major axis of shafts 190, 192 on the other hand, are more problematic. Drive arms 186, 188 of torque driver 124 to which drive blocks 178, 180 are attached, are formed of a single piece of material, and drive blocks 178, 180 are held in fixed relation to one another. If the two shaft segments 104, 106 are offset either to the left or right of the major axis of slots 190, 192, the drive blocks, and therefore the slots themselves, will be offset as well, with first slot 190 and second slot 192 being offset by equal amounts. With drive pins 174, 176 inserted into slots 190, 192 the contact carriers will be forced off center as well. One contact carrier will be forced to move clockwise around circuit rotor 112, and the other will be forced to rotate counterclockwise, both moving in the direction of the shaft offset. This opposed motion of the two contact carriers 116, 118 is possible since the two contact carriers are independent of one another. However, contact carriers 116, 118 moving in opposite directions in this manner introduce error into two the torque signal outputs. Fortunately, since the two drive slots 190, 192 are offset by equal amounts, the error introduced into the two torque signals will also be equal. Knowing this, it is possible to correct the torque signal outputs as outlined below in order to derive a true and accurate output signal proportional to the amount of torque being applied to shaft 102.

As the two shaft segments 104, 106 rotate relative to one another in response to torque, torque driver 124 drives contact carriers 116, 118 relative to circuit rotor 112. Torque driver 124 acts on the contact carriers through drive blocks 178, 180 and drive pins 174, 176. As torque driver 124 rotates relative to circuit rotor 112, only the sides of slots 190, 192 contact drive pins 174, 176, and since drive pins 174, 176 are round, drive blocks 178, 180 can only act on drive pins 174, 176 in a direction perpendicular to the sides of slots 190, 192. The elongated sides of slots 190, 192 are directed radially toward the axis of shaft segment 106. As torque driver 124 rotates, the force applied by drive blocks 178, 180 to drive pins 174, 176 will always be directed perpendicular to the sides of slots 190, 192, and therefore always tangent to a circle centered on the axis of shaft segment 106. Thus, while contact carriers 116, 118 are constrained to move around the axis of circuit rotor 112, the actual motion imparted to the contact carriers represents the angular motion of torque driver 124 and second shaft segment 106. Here it should be noted that the arrangement of the slots 190, 192 and drive pins 174, 176 can be reversed with no adverse affect on the sensor. By forming slots on contact carriers 116, 118 and circular drive pins on drive arms 186, 188, the same relative motion between torque driver 124, contact carriers 116, 118, and circuit rotor 112 can be achieved.

In operation, first signal ground reference contact 140, first signal voltage reference contact 144, first signal contact element 166, and resistive track 134, cooperate to generate a first torque signal $T_1$. Second signal ground reference contact 142, second signal voltage reference contact 146, second signal contact element 168, and resistive track 134 cooperate to generate a second torque signal $T_2$. As shaft 102 rotates, circuit rotor 112, driven by first shaft segment 104, drives reference contacts 140, 142, 144 and 146 around resistive track 134 in fixed relation to one another. Torque rotor 124, driven by second shaft segment 106, drives contact carriers 116, 118 which in turn drive signal contact elements 166, 168 around resistive track 134 in relative relation to signal voltage and ground reference contacts 138, 134 and 140, 136 respectively. This contact arrangement is best seen in FIG. 3.

Torque signal $T_1$ is generated as follows. First signal ground reference contact 140, first signal voltage reference contact 144, and first signal contact element 166 rotate around resistive track 134 in unison. The linear resistance of restive track 134 which separates first signal voltage reference contact 144 from first signal contact element 166, and first signal contact element 166 from first signal ground reference contact 140, acts as a voltage divider. With no torque applied to shaft 102, first and second shaft segments 104, 106 are at rest, with no angular deflection between the two. First signal contact element 166 is approximately half way between first signal voltage reference contact 144 and first signal ground reference contact 140, so that the voltage signal on first signal contact element 166 is approximately one half of the reference voltage being supplied to first signal voltage reference contact 144 from signal voltage reference track 132. When torque is applied to shaft 102, first and second shaft segments 104, 106 rotate slightly relative to one another due to the compliance of the torsion bar 107. Since first signal voltage reference contact 144 and first signal ground reference contact 140 are driven by first shaft segment 104 through circuit rotor 112, and since first signal contact element 166 is driven by second shaft segment 106 through torque driver rotor 124, the relative motion of the two shaft segments is translated to first signal contact element 166. Depending on the direction of the torque applied, first signal contact element 166 will move either closer to or further away from first signal voltage reference contact 144. As first signal contact element 166 moves closer to first signal voltage reference contact 144, the output voltage on signal $T_1$ increases towards the reference voltage. Conversely, as torque is applied in the opposite direction, first signal contact element 166 is forced away from first signal voltage reference contact 144 toward first signal ground reference contact 140, and the output voltage on signal $T_1$ decreases toward signal ground. In this way output voltage signal $T_1$ is generated, which is proportional to the amount of torque applied to shaft 102.

Output signal $T_2$ is derived in exactly the same way utilizing second signal ground reference contact 142, second signal voltage reference contact 146, and second signal contact element 168. However, since the second group of contacts are aligned as the mirror image of the first set of contacts, output signal $T_2$ will have the opposite polarity as signal $T_1$. Torque which causes first signal contact element 166 to move towards first signal voltage reference contact 144 will cause second signal contact element 168 to move away from second signal voltage reference contact 146. Thus, torque directed in a first direction will increase the voltage of $T_1$ while simultaneously decreasing the voltage of $T_2$. Torque applied in the opposite direction will have the opposite effect. In other words, the slope of output signals $T_1$ and $T_2$ will be opposite one another.

Figure 4:
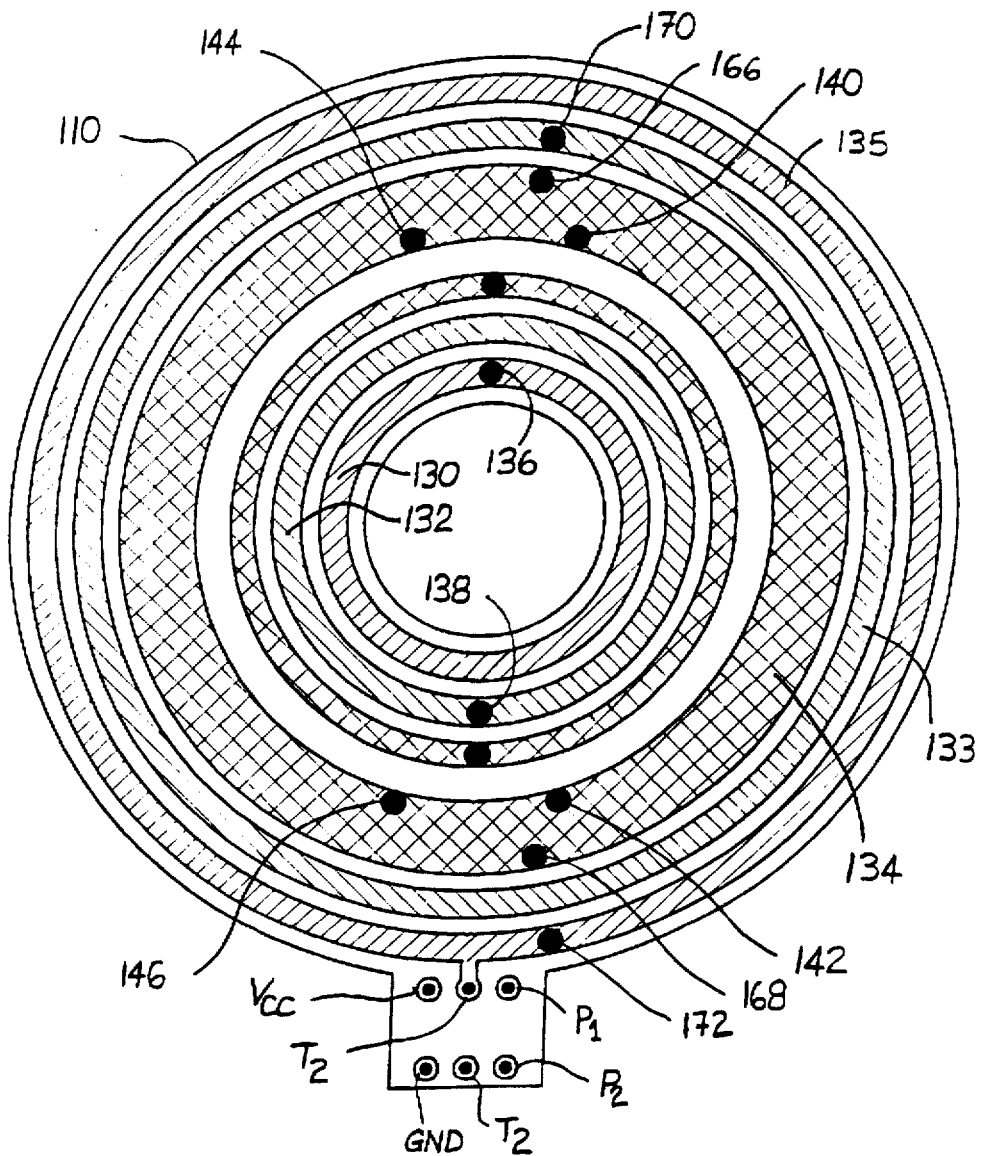
FIG. 4 is a plan view of the stationary disc of FIG. 3 showing the position of the various contacts when the two shaft segments are misaligned in a first direction.
Figure 5:
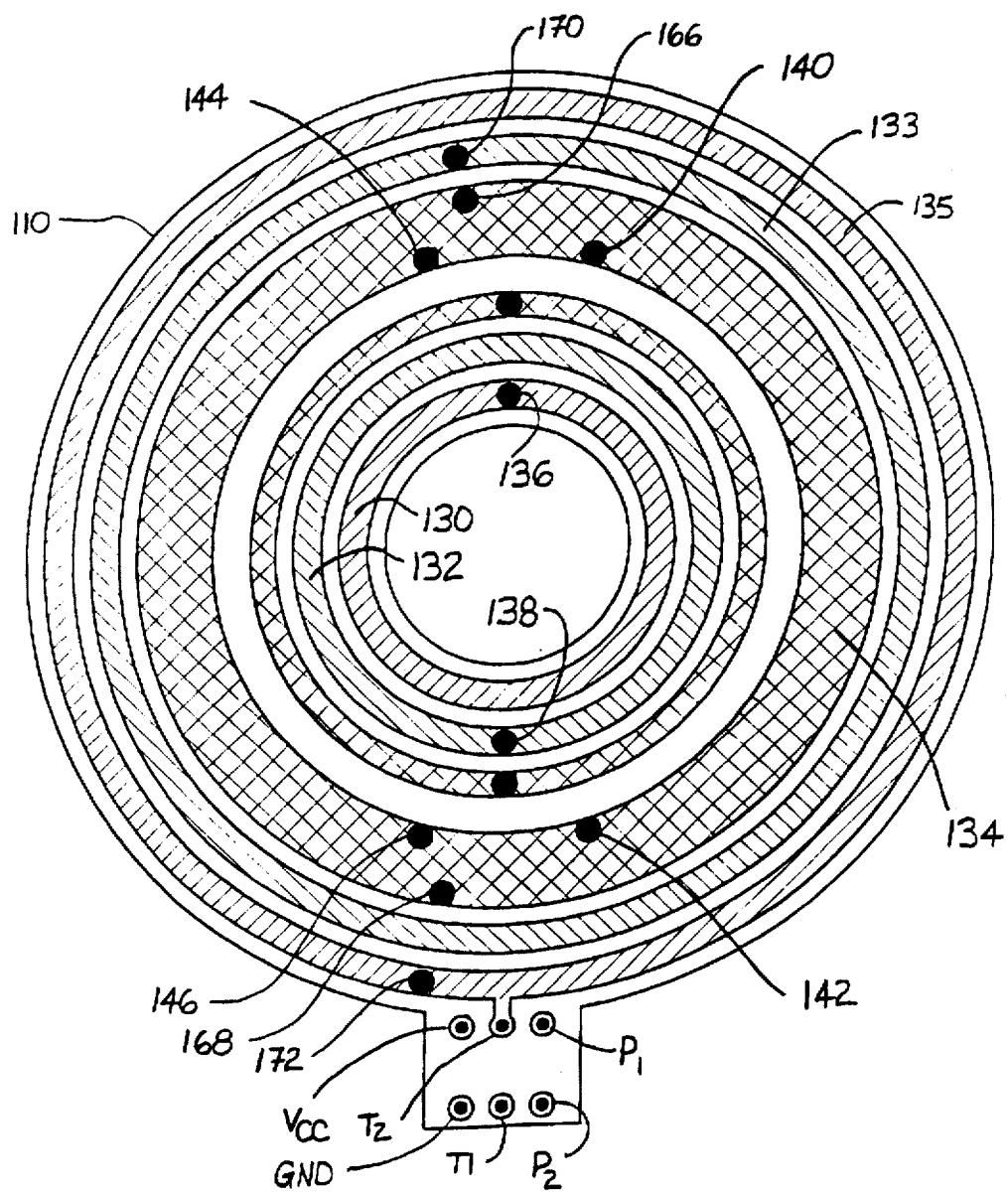
FIG. 5 is a plan view of the stationary disc of FIG. 3 showing the position of the various contacts when the two shaft segments are misaligned in the opposite direction as that shown in FIG. 4.

The above description detailing how output signals $T_1$ and $T_2$ are generated assumes that shaft segments 104, 106 are in proper alignment, and that when the two shaft segments rotate relative to one another, they are rotating around a common axis. This, however, represents only the optimum situation, and will not always be the case. Due to the compliance of the torsion bar, manufacturing tolerances, shock, and other factors, the alignment of the two shaft segments will generally be slightly offset. Thus, the point where signal contact elements 166, 168 line up when no torque is applied to shaft 102, will not be directly centered between the voltage and ground signal reference contacts (140, 144 for $T_1$; 142, 146 for $T_2$), as described above. Rather, both signal contact elements 166, 168 will be shifted either to the right or left, closer to either the signal voltage reference contacts 144, 146 or the signal ground reference contacts 140, 142 as can be seen in FIGS. 4 and 5. Such a shift will cause a voltage signal on both $T_1$ and $T_2$ which under normal operating conditions would be considered invalid. As is clear from FIG. 4, with signal contact elements 166, 168 shifted toward first and second ground reference contacts 140, 142, the voltage present on both signals $T_1$ and $T_2$ will be something less than one half of the reference voltage being supplied by signal voltage reference track 132. Under normal conditions this would be considered an invalid signal because at rest, the voltage on both $T_1$ and $T_2$ should equal the midpoint voltage between the signal ground reference and the signal voltage reference supplied by signal reference tracks 130, 132. Only when torque is applied to shaft 102 should the signal voltage on $T_1$ and $T_2$ vary from the midpoint voltage, and in that case the change in signal voltages on $T_1$ and $T_2$ should be equal and opposite. For example, if $T_1$ is increased by 1 volt over the midpoint voltage, then $T_2$ should decrease by a corresponding 1 volt below the midpoint voltage. The amount of torque being applied the shaft 102 being derived from the amount of variance of each signal from the midpoint voltage. When the two shaft segments are off centered, and both signal contact elements are shifted to one side or the other, the relationship between the amount of torque being applied to shaft 102 and the midpoint voltage between the signal ground reference and the signal voltage reference is destroyed. Torque can no longer be gauged by the change in voltage between the signal contact elements references.

With the present invention, a composite signal $T_c$ is generated from independent signals $T_1$ and $T_2$ which accommodates for any offset error due to the misalignment of shaft segments 104, 106. The composite signal is derived from the following formula:

$$T_c = \frac{T_1 - T_2}{2}$$

The above formula is best understood by applying it to a set of three examples. The values given for various voltages in the following examples are for illustration only, and should not be considered as limiting the scope of the present invention in any way. For each of the examples, consider a voltage signal reference of +5V supplied to circuit rotor 112.

In the first example consider the case when the two shaft segments 104, 106 are in rotational alignment. With no torque applied to shaft 102, both torque contact signal be positioned directly between their corresponding signal and ground reference contacts (FIG. 3). Thus, $T_1$ and $T_2$ will equal the midpoint voltage between the ground reference contacts and corresponding voltage signal contacts, in this example, +2.5V. Applying the above formula, $$T_c = \frac{2.5 - 2.5}{2} = 0 \text{ V,}$$

corresponding to 0 torque. If torque is applied in the clockwise direction, first signal contact element 166 will rotate toward first voltage reference contact 144, and second signal contact element 168 will rotate toward second ground reference contact 142. The voltage on signal $T_1$ will increase and the voltage on signal $T_2$ will decrease by a corresponding amount. Assume that the change in voltage is 0.5V. The voltage on signal $T_1$ will increase to +3.0V, and the voltage on signal $T_2$ will decrease to +2.0V. Applying the formula, $$T_C = \frac{3.0 - 2.0}{2} = +0.5 \text{ V},$$

indicating the correct change in voltage in the positive direction. Applying the same amount of torque in the opposite direction will cause first signal contact element 166 to rotate toward first ground reference contact 140, and second signal contact element 168 to rotate toward second voltage reference contact 146. The voltage on signal $T_1$ will decrease and the voltage on signal $T_2$ will increase by a corresponding amount. Assume again that the change in voltage is 0.5V. The voltage on signal $T_1$ will decrease to +2.0V, and the voltage on signal $T_2$ will increase to +3.0V. Applying the formula, $$T_C = \frac{2.0 - 3.0}{2} = -0.5 \text{ V},$$

indicating the correct change in voltage in the negative direction. Thus the composite signal $T_c$ provides a voltage signal proportional to the amount of torque being applied to shaft 102.

In the second example consider the case where the two shaft segments 104, 106 are out of alignment such that both signal contact elements 166, 168 are shifted toward their corresponding signal ground reference contacts 140, 142, as shown in FIG. 4. At rest, with no torque applied to shaft 102, the signal contact elements 166, 168 are not positioned directly between their corresponding signal voltage and ground reference contacts. Therefore, the voltage on signals $T_1$ and $T_2$ will not equal the midpoint voltage between the ground reference contacts and corresponding voltage signal contacts, but rather some voltage less than the midpoint voltage of +2.5V. For purposes of this example, assume that the offset voltage shift equals −1.0V such that the at rest voltage on both signals $T_1$ and $T_2$=+1.5V. Applying the above formula, $$T_C = \frac{1.5 - 1.5}{2} = 0 \text{ V},$$

corresponding to 0 torque. If torque is applied in the clockwise direction, first signal contact element 166 will rotate toward first voltage reference contact 144, and second signal contact element 168 will rotate toward second ground reference contact 142. The voltage on signal $T_1$ will increase and the voltage on signal $T_2$ will decrease by a corresponding amount. Assume that the change in voltage is 0.5V. The voltage on signal $T_1$ will increase to +2.0V, and the voltage on signal $T_2$ will decrease to +1.0V. Again applying the formula, $$T_C = \frac{2.0 - 1.0}{2} = +0.5 \text{ V},$$

indicating the correct change in voltage in the positive direction. Applying the same amount of torque in the opposite direction will cause first signal contact element 166 to rotate toward first ground reference contact 140, and second signal contact element 168 to rotate toward second voltage reference contact 146. The voltage on signal $T_1$ will decrease and the voltage on signal $T_2$ will increase by a corresponding amount. Assume again that the change in voltage is 0.5V. The voltage on signal $T_1$ will decrease to +2.0V, and the voltage on signal $T_2$ will increase to +3.0V. Applying the formula, $$T_C = \frac{2.0 - 3.0}{2} = -0.5 \text{ V},$$

indicating the correct change in voltage in the negative direction. Thus, even though the shaft misalignment causes a signal error of −0.5V in each signal $T_1$, $T_2$, the composite signal $T_c$ provides an accurate voltage signal proportional to the amount of torque being applied to shaft 102.

Finally, in the third example, consider the case where the two shaft segments 104, 106 are out of alignment such that both signal contact elements 166, 168 are shifted toward their corresponding signal voltage reference contacts 144, 146, as shown in FIG. 5. At rest, with no torque applied to shaft 102, the signal contact elements 166, 168 again are out of position relative to the midpoints between their respective signal and ground reference contacts. The signal voltages of $T_1$ and $T_2$ will not equal the midpoint voltage between the ground reference contacts and corresponding voltage signal contacts, but rather some voltage greater than the midpoint voltage of +2.5V. For purposes of this example, assume that the offset voltage shift equals +1.0V such that the at rest voltage on both signal $T_1$ and $T_2$=+3.5V. Applying the above formula, $$T_C = \frac{3.5 - 3.5}{2} = 0 \text{ V},$$

corresponding to 0 torque. If torque is applied in the clockwise direction, first signal contact element 166 will rotate toward first voltage reference contact 144, and second signal contact element 168 will rotate toward second ground reference contact 142. The voltage on signal $T_1$ will increase and the voltage on signal $T_2$ will decrease by a corresponding amount. Assume that the change in voltage is 0.5V. The voltage on signal $T_1$ will increase to +4.0V, and the voltage on signal $T_2$ will decrease to +3.0V. Applying the formula, $$T_C = \frac{4.0 - 3.0}{2} = +0.5 \text{V},$$

indicating the correct change in voltage in the positive direction. Applying the same amount of torque in the opposite direction will cause first signal contact element 166 to rotate toward first ground reference contact 140, and second signal contact element 168 to rotate toward second voltage reference contact 146. The voltage on signal $T_1$ will decrease and the voltage on signal $T_2$ will increase by a corresponding amount. Assume again that the change in voltage is 0.5V. The voltage on signal $T_1$ will decrease to +3.0V, and the voltage on signal $T_2$ will increase to +4.0V. Applying the formula, $$T_C = \frac{3.0 - 4.0}{2} = -0.5 \text{V},$$

indicating the correct change in voltage in the negative direction. Thus, even though the shaft misalignment causes a signal error of +0.5V in each signal $T_1$, $T_2$, the composite signal $T_c$ provides an accurate voltage signal proportional to the amount of torque being applied to shaft 102.

From the preceding examples it is clear that the present invention provides a torque sensor 100 for measuring the amount of torque being applied to a rotatable shaft 100. Two independent contact carriers 116, 118 rotationally coupled to first circuit rotor 112 accommodate potential misalignment of shaft segments 104, 106 while providing an accurate output voltage signal proportional to the amount of torque being applied to shaft 102.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A torque sensor for measuring the amount of torque applied to a rotatable shaft by measuring the angular displacement between a first shaft segment and a second shaft segment joined by a compliant torsion bar, said sensor comprising:

a first rotor attached to said first shaft segment;

a second rotor attached to said second shaft segment;

first and second electrical contact carriers coupled to said first rotor, and driven by said second rotor;

means for generating a first independent torque signal corresponding to the position of said first contact carrier relative to said first rotor; and means for generating a second independent torque signal corresponding to the position of said second contact carrier relative to said first rotor.

2. The torque sensor of claim 1 wherein said first and second contact carriers are coupled to said first rotor such that the relative motion of said contact carriers with respect to said first rotor is limited to angular displacement centered around the rotational axis of said first rotor.

3. The torque sensor of claim 2 wherein the means for coupling said first and second contact carriers to said first rotor comprises mating arcuate surface features formed on said first and second contact carriers and on said first rotor, the radial center of said mating arcuate surface features being the rotational axis of said first rotor.

4. The torque sensor of claim 1 wherein said means for generating a first independent torque signal comprises:

a first signal voltage reference provided by said first rotor;

a first signal ground reference provided by said first rotor;

a resistive track having a uniform linear resistance being in electrical contact with said first signal voltage reference and said first signal ground reference and extending therebetween; and a first torque signal contact extending from said first contact carrier to slidably engage said resistive track at a point between said signal voltage and signal ground references, whereby the voltage signal present on said first torque signal contact varies with the relative position of said contact between said signal voltage reference and said signal ground reference.

5. The torque sensor of claim 4 wherein said means for generating a second independent torque signal comprises:

a second signal voltage reference provided by said first rotor;

a second signal ground reference provided by said first rotor;

a resistive track having a uniform linear resistance being in electrical contact with said second signal voltage reference and said second signal ground reference and extending therebetween; and a second torque signal contact extending from said second contact carrier to slidably engage said resistive track at a point between said signal voltage and signal ground references, whereby the voltage signal present on said second torque signal contact varies with the relative position of said contact between said signal voltage reference and said signal ground reference.

6. The torque sensor of claim 1 further comprising a self adjusting drive linkage coupling said second rotor to said first and second contact carriers whereby said second rotor drives said contact carriers.

7. The torque sensor of claim 6 wherein said self adjusting drive linkage comprises:

first and second drive blocks formed on said second rotor, said drive blocks defining an elongate slot directed Radially outward from rotational the axis of said second rotor;

a first drive pin extending from said first contact carrier configured to engage the slot defined by said first drive block;

a second drive pin extending from said second contact carrier configured to engage the slot defined by said second drive block;

said first and second contact pins being round, and having diameters equal to the width of said first and second drive slots.

8. The torque sensor of claim 6 wherein said self adjusting drive linkage comprises:

first and second drive pins extending from said second rotor in the direction of said first and second contact carriers;

said first contact carrier defining a first radial slot directed outwardly away from the rotational axis of said first rotor, said first radial slot having a transverse width;

said second contact carrier defining a second radial slot directed outwardly away from the rotational axis of said first rotor, said second radial slot having a transverse width;

said first drive pin being round and configured to engage the radial slot defined by said first contact carrier, and having a diameter equal to the transverse width of said first slot;

said second drive pin being round and configured to engage the radial slot defined by said second contact carrier, and having a diameter equal to the transverse width of said second slot.

9. The torque sensor of claim 1 wherein a corrected output signal is derived by subtracting said second independent torque signal from said first independent torque signal, and dividing the result by two.

10. The torque sensor of claim 1 further comprising a housing for enclosing said first and second rotors and said first and second contact carriers, said housing including an annular wall centered on the rotational axis of said first rotor.

11. The torque sensor of claim 10 wherein:

said first rotor comprises a first edge surface, said first edge surface forming an arc centered on the rotational axis of the first rotor;

said first contact carrier comprises an arcuate first inner mating surface and an arcuate outer mating surface;

said first contact carrier first inner mating surface having substantially the same radius as said first rotor first edge surface; and said first contact carrier outer mating surface having substantially the same outer radius as said housing annular wall.

12. The torque sensor of claim 11 wherein:

said first rotor comprises a second edge surface, said second edge surface forming an arc centered on the rotational axis of the first rotor; and said first contact carrier comprises an arcuate second inner mating surface, having substantially the same radius as said first rotor second edge surface, smaller than the radius of said first edge surface and said first inner mating surface.

13. A torque sensor for measuring the amount of torque applied to a rotatable shaft by measuring the angular displacement between a first shaft segment and a second shaft segment joined by a compliant torsion bar, said sensor providing for misalignment of said shaft segments and comprising:

a first circuit rotor attached to said first shaft segment;

first and second electrical contact carriers coupled to said first rotor such that the relative motion of said contact carriers with respect to said first rotor is limited to angular displacement centered around the rotational axis of said first rotor;

in combination, said first rotor and said first and second contact carriers providing means for generating two independent torque signals based on the position of said first and second contact carriers relative to said first rotor, said two independent signals having opposite slopes;

a second rotor attached to said second shaft segment; and a self adjusting drive linkage between said second rotor and said first and second contact carriers whereby said second rotor imparts rotational motion to said contact carriers.

14. The torque sensor of claim 13 wherein said self adjusting drive linkage comprises:

first and second drive blocks formed on said second rotor, said drive blocks defining an elongate slot directed radially outward from the rotational axis of said second rotor;

a first drive pin extending from said first contact carrier configured to engage the slot defined by said first drive block;

a second drive pin extending from said second contact carrier configured to engage the slot defined by said second drive block;

said first and second contact pins being round, and having diameters equal to the width of said first and second drive slots.

15. The torque sensor of claim 13 wherein said self adjusting drive linkage comprises:

first and second drive pins extending from said second rotor in the direction of said first and second contact carriers;

said first contact carrier defining a first radial slot directed outwardly away from the rotational axis of said first rotor, said first radial slot having a transverse width;

said second contact carrier defining a second radial slot directed outwardly away from the rotational axis of said first rotor, said second radial slot having a transverse width;

said first drive pin being round and configured to engage the radial slot defined by said first contact carrier, and having a diameter equal to the transverse width of said first slot; said second drive pin being round and configured to engage the radial slot defined by said second contact carrier, and having a diameter equal to the transverse width of said second slot.

16. The torque sensor of claim 13 wherein the means for coupling said first and second contact carriers to said first rotor comprises mating arcuate surface features formed on said first and second contact carriers and on said first rotor, the radial center of said mating arcuate surface features being the rotational axis of said first rotor.

17. The torque sensor of claim 13 wherein said means for generating a first independent torque signal comprises:

a first signal voltage reference provided by said first rotor;

a first signal ground reference provided by said first rotor;

a resistive track having a uniform linear resistance being in electrical contact with said first signal voltage reference and said first signal ground reference and extending therebetween; and a first torque signal contact extending from said first contact carrier to slidably engage said resistive track at a point between said signal voltage and signal ground references, whereby the voltage signal present on said first torque signal contact varies with the relative position of said contact between said signal voltage reference and said signal ground reference.

18. The torque sensor of claim 17 wherein said means for generating a second independent torque signal comprises:

a second signal voltage reference provided by said first rotor;

a second signal ground reference provided by said first rotor;

a resistive track having a uniform linear resistance being in electrical contact with said second signal voltage reference and said second signal ground reference and extending therebetween; and a second torque signal contact extending from said second contact carrier to slidably engage said resistive track at a point between said signal voltage and signal ground references, whereby the voltage signal present on said second torque signal contact varies with the relative position of said contact between said signal voltage reference and said signal ground reference.

19. The torque sensor of claim 13 wherein a corrected output signal is derived by subtracting said second independent torque signal from said first independent torque signal, and dividing the result by two.

20. A method for generating a corrected output signal from a torque sensor configured to measure the amount of torque being applied to a rotatable shaft by measuring the angular displacement between a first shaft segment and a second shaft segment joined by a compliant torsion bar, the method comprising the steps of:

generating a first torque signal;

generating a second torque signal having a slope opposite that of said first signal; and generating a corrected output signal by subtracting said second signal from said first signal, and dividing the result by two.

21. The method of claim 20 wherein the step of generating said first torque signal further includes the steps of:

providing a first signal voltage reference from a first rotor attached to said first shaft segment;

providing a first signal ground reference from said first rotor;

providing a resistive track having a uniform linear resistance in electrical contact with said first signal voltage reference and said first signal ground reference and extending therebetween; and providing a first torque signal contact extending from a first independent contact carrier driven by a second rotor attached to said second shaft segment, to slidably engage said resistive track at a point between said signal voltage and signal ground references, whereby the voltage signal present on said first torque signal contact varies with the relative position of said contact between said signal voltage reference and said signal ground reference.

22. The method of claim 21 wherein the step of generating said second torque signal further includes the steps of:

providing a second signal voltage reference from said first rotor;

providing a second signal ground reference from said first rotor;

providing a resistive track having a uniform linear resistance in electrical contact with said second signal voltage reference and said second signal ground reference and extending therebetween; and providing a second torque signal contact extending from a second independent contact carrier driven by said second rotor, to slidably engage said resistive track at a point between said signal voltage and signal ground references, whereby the voltage signal present on said second torque signal contact varies with the relative position of said contact between said signal voltage reference and said signal ground reference;

the location of said second signal voltage reference and said second signal ground reference being reversed as compared to said first signal voltage reference and said first signal ground reference such that said second torque signal has an opposite slope from said first torque signal.

23. A Torque Sensor for measuring the amount of torque applied to a segmented rotatable shaft wherein said shaft segments are joined by a compliant torsion bar and torque is measured by monitoring the relative angular position of said shaft segments, said sensor comprising:

a housing;

a stationary disc formed of an insulating material mounted to said housing;

a circular resistive track having a uniform linear resistance formed on a surface of said disc;

a circuit rotor attached to a first shaft segment such that said circuit rotor rotates with said first shaft segment;

a first pair of reference contacts, and a second pair of reference contacts extending from said circuit rotor to slidably engage said resistive track, said first pair of reference contacts comprising a first signal voltage reference contact and a first ground reference contact, said second pair of reference contacts comprising a second signal voltage reference contact and a second ground reference contact;

a torque drive rotor attached to a second shaft segment such that said torque drive rotor rotates with said second shaft segment;

first and second contact carriers disposed between said circuit rotor and said torque drive rotor, said contact carriers being coupled to said circuit rotor such that said contact carriers are constrained to move circularly relative to said circuit rotor around the rotational axis of said circuit rotor;

a first signal contact extending from said first contact carrier slidably engaging said resistive track at a point between said first pair of reference contacts for generating a first independent torque signal;

a second signal contact extending from said second contact carrier slidably engaging said resistive track at a point between said second pair of reference contacts for generating a second independent torque signal; and a self adjusting drive linkage between said torque drive rotor and said first and second contact carriers whereby said torque drive rotor imparts rotational motion to said first and second contact carriers.

24. The torque sensor of claim 23 wherein arcuate ridges formed on said circuit rotor engage mating arcuate grooves formed on said contact carriers to limit the motion of said contact carriers relative to said circuit rotor.

25. The sensor of claim 23 wherein said drive linkage comprises:

a pair of drive blocks formed on said torque drive rotor, said drive blocks defining radially directed internal drive slots having radially directed side walls; and cylindrical drive pins extending from each contact carrier, said drive pins being configured to engage said drive slots, said drive pins having a diameter equal to the width of said drive slots.

26. The sensor of claim 23 wherein said drive linkage comprises:

contact carriers defining radially directed drive slots having radially directed internal side walls;

cylindrical drive pins extending from said torque rotor configured to engage said drive slots, said drive pins having a diameter equal to the width of said drive slots;

whereby said drive pins act on said radially directed side walls to drive said contact carriers.

27. The torque sensor of claim 23 wherein a composite signal is derived by subtracting said second independent torque signal from said first independent torque signal, and dividing the result by two.

* * * * *